June 14, 1949.   C. J. RHODES   2,473,219
GUARD ARRANGEMENT FOR POWER PRESSES
Filed March 26, 1947
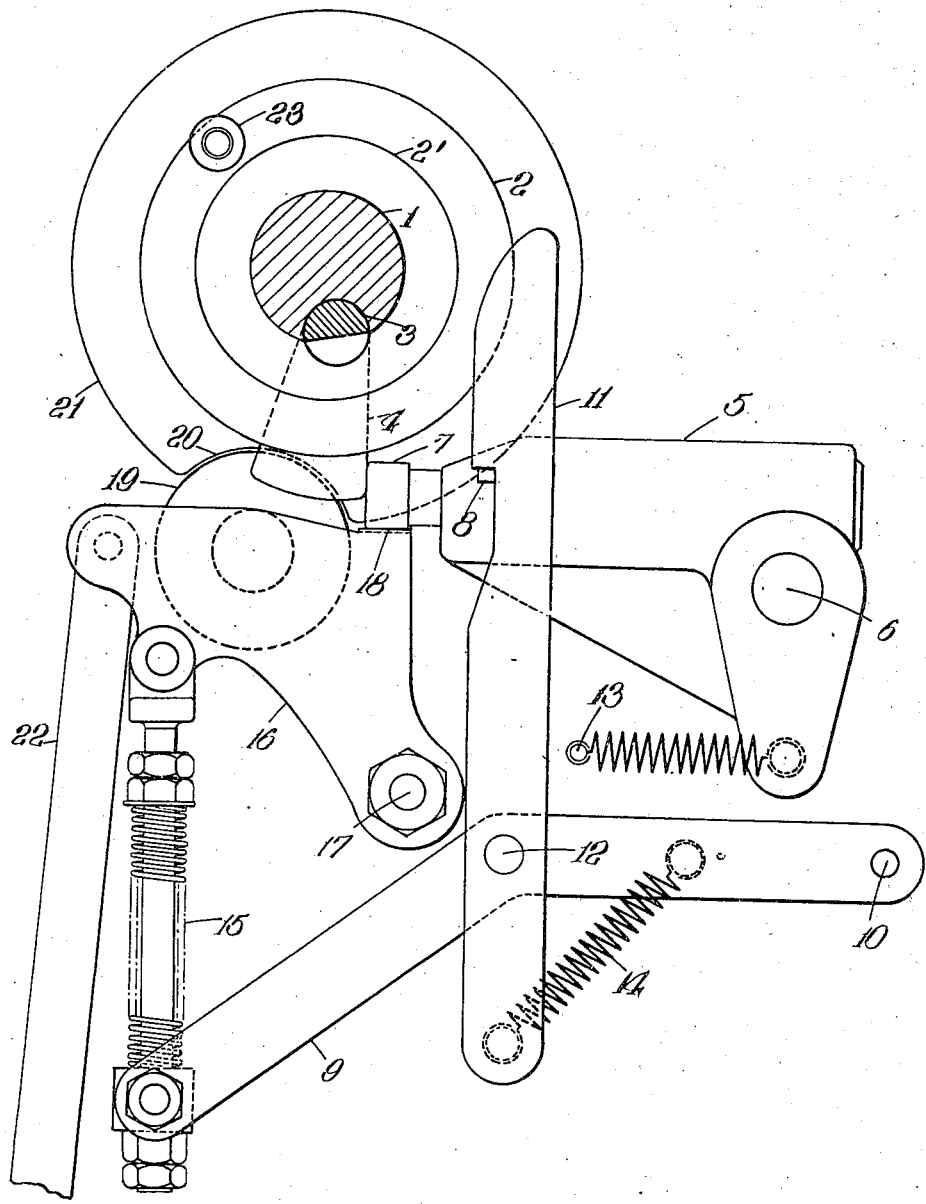
INVENTOR
Charles Joseph Rhodes
BY
Mock & Blum
ATTORNEYS Patented June 14, 1949

2,473,219

UNITED STATES PATENT OFFICE 2,473,219

GUARD ARRANGEMENT FOR POWER PRESSES

Charles Joseph Rhodes, Wakefield, England

Application March 26, 1947, Serial No. 737,297
In Great Britain June 19, 1946

8 Claims. (Cl. 192—134)

This invention relates to power presses and has for its object to provide an improved guard arrangement whereby the operator is safeguarded while at the same time the speed of operation which can be attained is higher than in conventional guard arrangements.

In power presses it is usual to provide between the driving shaft and the driven member of the press a clutch mechanism which normally is disengaged but can be caused to engage to drive the press for one cycle whereupon the clutch disengages and the press ceases to operate. Such a single cycle clutch may take various forms, one convenient construction being the well-known rolling key clutch in which the operative portion of the key is substantially semi-cylindrical and is adapted to be turned about the axis of the cylinder from a position in which it lies wholly within a semi-cylindrical recess in one clutch element to a position in which it lies partly in the said recess and partly in a complementary recess in the other clutch element so as to form a driving connection between the two clutch elements.

The present invention provides in a power press provided with a clutch mechanism, a clutch actuating member, a control member restraining said clutch actuating member from movement into the operative position, and a press guard mechanically connected to said control member so as fully to withdraw the same from restraining said clutch actuating member when said press guard is closed, said control member being connected to said clutch actuating member through a spring link adapted to be stressed by the motion of withdrawal of said control member and thereby resiliently to urge said clutch actuating member towards the operative position. With the above arrangement the press guard is coupled with the clutch, so that when the guard is closed the clutch is engaged to operate the press. Consequently, to operate the press only two movements are required, viz:

(1) Placing the blank in position,
(2) Closing the guard.

As the latter movement causes engagement of the clutch, no further action on the part of the operator is required after closing the guard, i. e. a separate manipulation of a clutch-controlling pedal or the like is eliminated, but due to the interlocking action of the control member with the clutch actuating member, the press cannot be operated while the guard is in the open position.

Preferably further interlocking means associated with the control member are provided for engaging with the driven member of the clutch mechanism so as to lock it against rotation when the guard is open. On closing the guard and withdrawing the control member from the clutch actuating member, the interlocking means are withdrawn from engagement with the driven member.

One embodiment of the invention, as applied to a press having a rolling key clutch mechanism, will now be described with reference to the accompanying drawing, the single figure of which is a diagrammatic end elevation, partly in section showing only those parts necessary to an understanding of the invention.

Referring now to the drawing, the clutch mechanism of the press is of the known rolling key type, but will briefly be described for the sake of clearness. The driven member of the clutch mechanism comprises a driven shaft 1 carrying a stepped collar having an enlarged portion 2 and a reduced portion 2'. A rolling key 3, provided with a clutch actuating member in the form of a lever 4 projecting through a radial slot in the enlarged portion 2 of the collar lies in a semi-cylindrical recess in the shaft 1 and a corresponding recess in the collar 2, 2'. Above the plane of the drawing the shaft 1 is received in a collar (not shown) on the driving shaft, this collar being provided with a similar semi-cylindrical recess. The rolling key 3 is shown in the disengaged position and is urged by a spring (not shown) to rotate counterclockwise into the engaged position. The operative part of the rolling key 3 is of semi-cylindrical shape and in the disengaged position shown lies wholly within the semi-cylindrical recess in the shaft 1. On rotation of the rolling key 3 into the engaged position, the semi-cylindrical portion lies partly within the recess in the shaft 1, and partly within the recess in the driving collar, coupling the two together.

The arrangement according to the invention for coupling the press guard to the clutch mechanism will now be described.

A trip member, in the form of a bell-crank lever 5 is pivoted about an axis 6 and carries on one arm a spring loaded stop 7 and a projecting lug 8. The other arm of the bell-crank lever 5 is connected to a tension spring 13 anchored to the frame of the press. A cranked intermediate lever 9 is pivoted about an axis 10 and carries a latch member 11 pivoted about an axis 12. The latch member is connected below the axis 12 by a tension spring 14 to the intermediate lever 9 at a point intermediate the axes 10 and 12. The end of the intermediate lever 9 is connected by a compression spring link 15 to the end of a cranked lever 16 pivoted about an axis 17, the lever 16 constituting the control member. The lever 16 is provided with a seating 18 supporting the stop 7, and carries a roller 19 engaging in a dwell 20 in a cam 21 carried on the driven shaft 1. A link 22 connects the end of the lever 15 to a press guard, not shown. A roller 23 is provided on the enlarged portion 2 of the collar.

In the position shown the press guard is open, the roller 19 engaging in the dwell 20 prevents rotation of the driven member, and the stop 7 of the control member 5 prevents the lever 4 of the rolling key 3 from moving into the engaged position.

On closing the guard, movement is transmitted through the link 22, progressively rotating the control member 16 counterclockwise. The roller 19 is progressively withdrawn from the dwell 20, and the seating 18 from the stop 7. Meanwhile the spring link 15 is compressed and transmits a force to the trip member 5 through the intermediate lever 9, the latch member 11, and the lug 8, urging the trip member 5 to rotate counterclockwise against the action of the spring 13. When the roller 19 has been fully withdrawn from the dwell 20, the seating 18 is fully withdrawn from the stop 7, and the stored energy of the spring link 15 causes the trip member 5 to rotate rapidly counterclockwise, irrespective of the speed at which the guard closes, removing the stop 7 from the lever 4 of the rolling key. The clutch is then free to engage and the driven clutch element starts to rotate. The cam 21 associated with the driven element prevents reopening of the guard as it prevents restoration of the control member 16 to its initial position.

As the driven shaft revolves, the roller 23 comes into contact with the toe of the latch member 11, disengaging the latter from the lug 8 of the trip member 5. The latter rotates clockwise under the action of the tension spring 13 and reverts to its initial position.

As the driven element completes one revolution the stop 7 abuts the lever 4, rotating the rolling key 3 clockwise and disengaging the drive. The dwell 20 is now in position to receive the roller 19, so that with the clutch disengaged and the press at rest the guard can be opened again, rotating the control member 16 clockwise.

The motion of opening the press guard is transmitted through the spring link 15, rotating the intermediate lever 9 clockwise and raising the latch member 11. The latter is urged by the tension spring 14 against the lug 8, with which it once more engages in the raised position. The mechanism is now fully restored to its initial position.

The above-described embodiment is particularly suitable for use with a clutch of the rolling key type. It will be understood, however, that a similar construction may equally be applied to other types of clutch mechanism, by interposing a spring link under compression between a control or interlocking member and the clutch actuating means.

I claim:

1. In a power press provided with a rolling key clutch mechanism, a clutch lever spring-urged to move said mechanism into engagement, a trip member adapted in a first position to prevent and in a second position to permit, said movement of said clutch lever, a control member restraining said trip member from movement into said second position, and a press guard mechanically connected to said control member so as fully to withdraw the same from said trip member when said press guard is closed, said control member being connected to said trip member through a spring link adapted to be stressed by the motion of withdrawal of said control member and thereby resiliently to urge said trip member towards said second position.

2. In a power press provided with a rolling key clutch mechanism, a clutch lever spring-urged to move said mechanism into engagement, a trip member adapted in a first position to prevent and in a second position to permit, said movement of said clutch lever, a control member restraining said trip member from movement into said second position, a press guard mechanically connected to said control member so as fully to withdraw the same from said trip member when said press guard is closed, a driven member of said clutch mechanism, and means associated with said control member for engaging with and thereby restraining from rotation said driven member and for disengaging from said driven member on withdrawal of said control member, said control member being connected to said trip member through a spring link adapted to be stressed by the motion of withdrawal of said control member and thereby resiliently to urge said trip member towards said second position.

3. In a power press provided with a rolling key clutch mechanism, a lever on said rolling key spring-urged to move into the engaged position, a trip lever adapted in a first position to prevent and in a second position to permit, said movement of said first-mentioned lever into the engaged position, a control lever restraining said trip lever from movement into said second position, a press guard positively connected to said control lever so as fully to withdraw the same from restraining said trip lever when said press guard is closed, an intermediate lever, a latch member releasably connecting said intermediate lever to said trip lever, and a spring link connecting said control lever to said intermediate lever and adapted to be stressed by the motion of withdrawal of said control lever and thereby resiliently to transmit through said intermediate lever and said latch member a force urging said trip lever towards said second position.

4. In a power press provided with a rolling key clutch mechanism, a lever on said rolling key spring-urged to move into the engaged position, a trip lever adapted in a first position to prevent and in a second position to permit, said movement of said first-mentioned lever into the engaged position, a control lever restraining said trip lever from movement into said second position, a press guard positively connected to said control lever so as fully to withdraw the same from restraining said trip lever when said press guard is closed, an intermediate lever, a latch member releasably connecting said intermediate lever to said trip lever, a spring link connecting said control lever to said intermediate lever and adapted to be stressed by the motion of withdrawal of said control lever and thereby resiliently to transmit through said intermediate lever and said latch member a force urging said trip lever towards said second position, and means associated with said clutch mechanism for releasing said latch member from said trip lever on drive being transmitted by said clutch mechanism and for returning said trip lever into said first-mentioned position.

5. In a power press provided with a rolling key clutch mechanism, a lever on said rolling key spring-urged to move into the engaged position, a trip lever adapted in a first position to prevent and in a second position to permit, said movement of said first-mentioned lever into the engaged position, a control lever restraining said trip lever from movement into said second position, a press guard positively connected to said control lever so as fully to withdraw the same from restraining said trip lever when said press guard is closed, an intermediate lever, a latch member releasably connecting said intermediate lever to said trip lever, a spring link connecting said control lever to said intermediate lever and adapted to be stressed by the motion of withdrawal of said control lever and thereby resiliently to transmit through said intermediate lever and said latch member a force urging said trip lever towards said second position, means associated with said clutch mechanism for releasing said latch member from said trip lever on drive being transmitted by said clutch mechanism and for returning said trip lever into said first-mentioned position, a driven member of said clutch mechanism, and means associated with said control lever for engaging with and thereby restraining from rotation said driven member and for disengaging from said driven member on withdrawal of said control lever.

6. In a power press provided with a clutch mechanism, a clutch lever spring-urged to move said mechanism into engagement, a trip member which is engageable with said clutch lever to prevent it from moving the clutch mechanism into engagement, a spring connected to said trip member and urging it, when loaded, to disengage the clutch lever, a control member which is engageable with said trip member to prevent the trip member from disengaging the clutch lever, and a press guard which is connected to said control member for movement therewith, said control member being movable out of engagement with the trip member when the guard is moved into closed position, said control member being connected to said spring to load the spring when it moves with the press guard out of engagement with the trip lever, whereby said trip lever is freed to move in response to the action of said loaded spring thereon, out of engagement with the clutch lever, to release said clutch lever for moving the clutch mechanism into engagement.

7. In a power press provided with a clutch mechanism, a clutch actuating member, a control member restraining said clutch actuating member from movement into the operative position, and a press guard mechanically connected to said control member so as fully to withdraw the same from restraining said clutch actuating member when said press guard is closed, said control member being connected to said clutch actuating member through a spring link adapted to be stressed by the motion of withdrawal of said control member and thereby resiliently to urge said clutch member towards the operative position.

8. In a power press provided with a clutch mechanism, a clutch actuating member, a control member restraining said clutch actuating member from movement into the operative position, a press guard mechanically connected to said control member so as fully to withdraw the same from restraining said clutch actuating member when said press guard is closed, a driven member of said clutch mechanism, and means associated with said control member for engaging with and thereby restraining from rotation said driven member and for disengaging from said driven member on withdrawal of said control member, said control member being connected to said clutch actuating member through a spring link adapted to be stressed by the motion of withdrawal of said control member and thereby resiliently to urge said clutch actuating member towards the operative position.

CHARLES JOSEPH RHODES.

REFERENCES CITED

The following references are of record in the file of this patent:

UNITED STATES PATENTS

| Number | Name | Date |
| --- | --- | --- |
| 1,258,525 | Beyer | Mar. 5, 1918 |
| 2,381,237 | Wells | Aug. 7, 1945 |
| 2,382,316 | Hodges | Aug. 14, 1945 |

FOREIGN PATENTS

| Number | Country | Date |
| --- | --- | --- |
| 17,419 | Great Britain | July 22, 1910 |